(12) United States Patent
Kazmaier et al.

(10) Patent No.: US 9,721,364 B2
(45) Date of Patent: Aug. 1, 2017

(54) POLYGON SIMPLIFICATION

(71) Applicants: Gerrit Simon Kazmaier, Heidelberg (DE); Hinnerk Gildhoff, Heidelberg (DE); Lars Volker, Karlsruhe (DE); Tim Grouisborn, Mannheim (DE)

(72) Inventors: Gerrit Simon Kazmaier, Heidelberg (DE); Hinnerk Gildhoff, Heidelberg (DE); Lars Volker, Karlsruhe (DE); Tim Grouisborn, Mannheim (DE)

(73) Assignee: SAP SE, Walldorf (DE)

( * ) Notice: Subject to any disclaimer, the term of this patent is extended or adjusted under 35 U.S.C. 154(b) by 140 days.

(21) Appl. No.: 14/325,236

(22) Filed: Jul. 7, 2014

(65) Prior Publication Data

US 2016/0005141 A1 Jan. 7, 2016

(51) Int. Cl.
*G06T 1/60* (2006.01)
*G06T 11/20* (2006.01)
*G06F 17/30* (2006.01)

(52) U.S. Cl.
CPC ............ *G06T 11/203* (2013.01); *G06F 17/30* (2013.01)

(58) Field of Classification Search
CPC . G06T 1/60; G09G 5/393; G09G 5/14; G09G 2340/0407; G09G 5/39

USPC ......................................................... 345/530
See application file for complete search history.

(56) References Cited

U.S. PATENT DOCUMENTS

| 6,798,411 | B1 * | 9/2004 | Gorman | G06T 17/20 345/420 |
|---|---|---|---|---|
| 2003/0052875 | A1 * | 3/2003 | Salomie | G06T 17/20 345/419 |
| 2008/0180447 | A1 * | 7/2008 | Bertoncini | G01N 30/86 345/440.1 |
| 2013/0100134 | A1 * | 4/2013 | Cervelli | G06T 11/20 345/420 |

OTHER PUBLICATIONS

"Topology Preserving and Controlled Topology Simplifying Multiresolution Isosurface Extraction" (Published in Visualization 2000. Proceedings, Date of Conference: Oct. 13, 2000, by Thomas Gerstner and Renato Pajarola).*

* cited by examiner

*Primary Examiner* — Ke Xiao
*Assistant Examiner* — Gordon Liu
(74) *Attorney, Agent, or Firm* — Mintz Levin Cohn Ferris Glovsky and Popeo, P.C.

(57) ABSTRACT

Polygons can be simplified from an original, higher resolution to a simplified, lower resolution such that the simplified versions of the polygons do not introduce errors and also do not render boundaries shared with other polygons invalid.

20 Claims, 8 Drawing Sheets

300

| ValueID | Value ( DOUBLE ) |
|---|---|
| 1 | 0.0 |
| 2 | 1.0 |
| 3 | 3.0 |
| 4 | 4.0 |

*FIG. 3A*

| ValueID | Value ( DOUBLE ) |
|---|---|
| 1 | 0.0 |
| 2 | 1.0 |
| 3 | 2.0 |
| 4 | 3.0 |
| 5 | 5.0 |

*FIG. 3B*

| SegmID | DocID | Start X | Start Y | End X | End Y |
|---|---|---|---|---|---|
| 1 | 1 | 1 | 1 | 2 | 2 |
| 2 | 1 | 2 | 2 | 2 | 3 |
| 3 | 1 | 2 | 3 | 3 | 4 |
| 4 | 2 | 4 | 5 | 2 | 2 |
| 5 | 2 | 2 | 2 | 2 | 4 |
| 6 | 2 | 2 | 4 | 3 | 5 |
| 7 | 3 | 2 | 5 | 3 | 2 |
| 8 | 3 | 3 | 2 | 3 | 4 |
| 9 | 3 | 3 | 4 | 4 | 2 |

POLYGON SIMPLIFICATION

TECHNICAL FIELD

The subject matter described herein relates to spatial data, for example spatial data representing areas or volumes as polygons or polyhedrons.

BACKGROUND

Polygons can be stored in databases (including but not limited to high speed, in main-memory databases such as HANA available from SAG AG or Walldorf, Germany) to support various applications, such as for example definitions of sales regions, disaster regions, geographical or political boundaries, and the like. For simplicity of explanation, discussions herein of polygons are intended to refer to both two-dimensional polygons.

Column-oriented data structures serving as a basis for column-stores have recently matured into a powerful component of today's enterprise applications. Column-stores can be found as standalone in-main memory database systems (e.g. the SAP HANA platform, available from SAP AG of Walldorf, Germany), or alternatively, integrated into other types of systems, including for example business software systems such as enterprise resource planning (ERP) systems or the like. Column store based data management architectures have proven to be superior to traditional row-stores in terms of performance, in particular for online analytical processing (OLAP) analytical workloads that are common in data warehousing and business intelligence (BI) applications. One reason for this improved performance relative to previously available approaches is the ability to efficiently process (compressed) column-oriented, in-main memory data structures through hardware-optimized scans. Several recent developments have added to improvements in performance and functionality, such as transactional environments or compression techniques.

For traditional warehouse and BI applications, the primary focus in terms of information needs has been on transactional data. Such data includes information about products, manufacturers, suppliers, customers, sales and shipment transactions, and the like. While storage and query processing techniques have been highly optimized for analytical workloads operating on such data, the aspect that the majority of the data also have some geographic component has mostly been neglected. Although information about point-of-sales or customer records typically contains address information, characteristics of such data, including tailored functionality such as spatial and topological predicates, have received little attention. A typical current approach is to geocode address information and to manage respective latitude and longitude information for addresses in extra fields. This approach is also applied in conventional column-oriented data management architectures in support of BI applications. With such arrangements, geographic coordinates corresponding to addresses are managed in standard columns that simply contain floating-point numbers. In other words, geographic data is not handled in a native way but managed and queried using techniques that are employed for traditional numeric and textual data.

An intuitive approach to add spatial features to column stores is to employ some of the proven spatial index structures that are used in relational database management systems (DBMS). Viable candidates for such an approach are R-Tree variants, K-d Trees, or Quadtrees, among many other (specialized) spatial index structures. However, these index structures are mainly targeted towards efficient access to secondary storage structures and therefore focus on block-optimized read and write operations. For column-organized data managed in an in-memory database, however, such tree-based index structures are not appropriate. There are several reasons for this limitation. First, column stores gain their performance through optimized scans of vector data that is not chunked into blocks. Second, tree-based index structures like the ones mentioned above incur overhead in space and time complexity because an index itself needs to be managed. In particular, nodes in these tree structures are linked in support of search and update procedures. Thus, they do not provide for continuous scans of in main-memory structures but require following link structures.

SUMMARY

In various aspects of the current subject matter, data structures and approaches consistent with those described herein can support intelligent resolution reduction (also referred to as "simplification" of polygons stored within a database. A simplification approach can include dissection of a first polygon into line segments or paths, omission of one or more points (e.g. a second point occupying a same pixel as a preceding point in the simplified resolution version of the polygon), increasing a local resolution for a part (e.g. a line segment, a path, etc.) of a polygon if omission of a point results in an error. The simplification approach can also include validation of the dissection results, for example by use of an inverse mapping of paths or line segments to polygons within which the paths or line segments are included. An increase in a local resolution required for a path can also be applied to the path appearing in a second polygon whose boundary is shared with the first polygon.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system, database management system, or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A and FIG. 3B show X-dimension and Y-dimension dictionary representations of the coordinates appearing in the linestrings of FIG. 2;

When practical, similar reference numbers denote similar structures, features, or elements.

DETAILED DESCRIPTION

Figure 1:
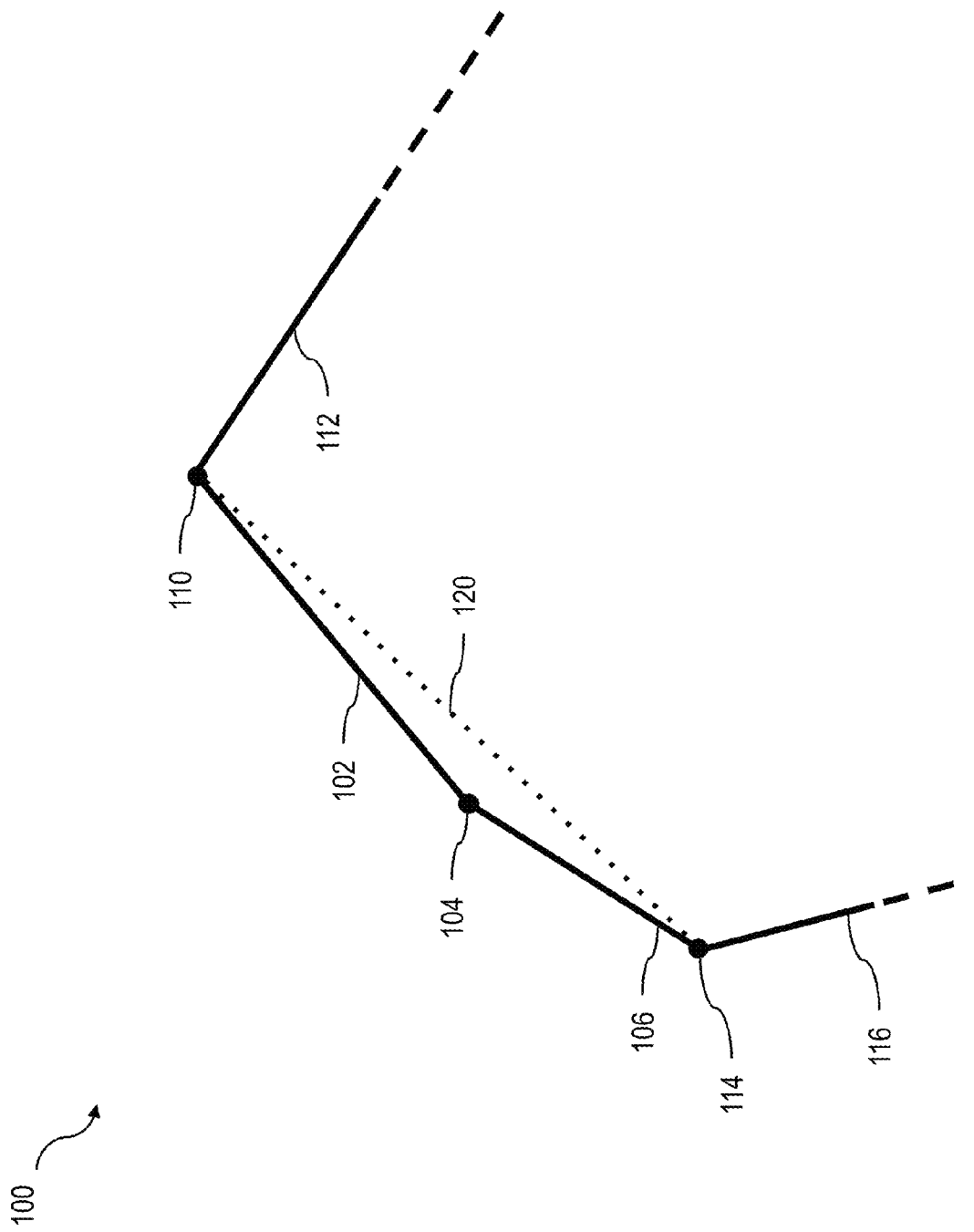
FIG. 1 shows a chart plotting line segments into which an example polygon can be decomposed.

Application developers can use polygons as content to display in native applications and web browsers, either in a stand-alone fashion or overlaid onto geographical maps as well as in other potential applications for representing areas or volumes. Polygonal representations are typically stored in a database with a very high level of detail or resolution and thus can consume a significant amount of storage space and also bandwidth when being transmitted from a server to a client over a network. However, some polygons defining very large geographical regions (e.g. an outline of a country) or other areas or volumes may not be displayed at their highest level of detail but rather "far from above" or where fine-grained detail may be less important. Accordingly, an ability to deliver a coarser grained, simplified version of a polygon can result in savings in transmission time between a server and one or more client machines, thereby improving user interaction speed, computation performance, etc. Simplification of polygons can also facilitate displaying a large number of polygons at once, which in sum could not be handled by a client machine at full resolution.

Consistent with implementations of the current subject matter, polygons and multi-polygons can be simplified for display at lower resolution while preserving an overall topology represented at a higher resolution at which a polygon or multi-polygon is stored. Polygon simplification can be achieved using an approach that includes a dissection process and a validation process.

The dissection process can include decomposing a plurality of polygons internally into a sequence of paths. Each path (e.g. a line that can be straight or alternatively, can include one or more curves) includes points with exactly two neighbors. An example of this feature is illustrated in the view of part of a polygon 100 shown in FIG. 1 in which paths are shown as straight line segments. An example line segment 102 in the polygon connects a first point 104, which is shared with a first neighboring line segment 106, with a second point 110, which is shared with a second neighboring line segment 112. The first neighboring line segment 106 is defined by the first point 104 and a third point 114, which is in turn shared with yet another line segment 116, and so forth. The decomposed sequences can be stored, for example in one or more columns of a database. The dissection constructs an internal graph representation in which nodes are all points contained in the polygon. An edge between two nodes is inserted if the nodes follow another in at least one polygon.

It will be understood that the term path as used herein need not refer only to straight line segments as shown in FIG. 1. Rather, a path can include a straight or non-straight line that includes a plurality of points. In some examples, a path can include all or some of a shared boundary between two neighboring polygons. For example, a path can define a border between two geographic areas such as countries. A second path can define a border between one of the two geographic areas and a third geographic area. Paths can optionally be stored with some amount of compression as line segments, such as is described in the following paragraphs.

Figure 2:
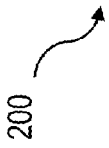
FIG. 2 shows a table listing a set of linestrings that are part of an illustrative example of features consistent with the current subject matter.

An example of storage of the line segments into which paths of one or more polygons can be decomposed can be explained by reference to storage of line segments generally, for example storage of a set of line segments into which a linestring is decomposed. In the case of a polygon, such a linestring generally closes back upon itself such that a last point of a last line segment of the linestring forming the polygon is the same as a first point of a first line segment of a first linestring forming the polygon. FIG. 2 shows a table 200 listing an example set of linestrings as a set of X, Y pairs that are connected to form at least part of a polygon.

The data representing lines segments of polygons in a spatial data set can optionally be compressed by applying a dictionary compression approach. In such an approach, the linestrings listed in FIG. 2 can be broken down (e.g. decomposed) into individual line segments, which can be stored in a set of dimensional dictionaries, one for each dimension. For two-dimensional data as in the current example, two dimensional dictionaries can be used to retain the X and Y coordinates, respectively, for each of the points appearing in at least one line segment of a linestring in the example set. FIG. 3A and FIG. 3B show the two dimensional dictionaries 300, 350, which list each coordinate dimension for the two-dimensional data set that includes the linestrings listed in the table 200 of FIG. 2. It will be readily understood that a three-dimensional data set would have three such dimensional dictionaries, while a four-dimensional or greater data set would have a number of dimensional dictionaries corresponding to the existent number of dimensions.

Figure 4:
FIG. 4 shows a line segment table representing the linestrings of FIG. 2 as a set of line segments based on the dictionaries of FIG. 3A and FIG. 3B.

FIG. 4 shows a line segment table 400 illustrating how the polygon linestrings shown in the table 200 of FIG. 2 are represented as a set of line segments using the dimensional dictionaries 300 and 350. In the line segment table 400, the values in the docID column refer to the linestring to which the line segment defined in each row of the line segment table 400 belong. Such values can optionally be considered to be rowID values referring back to the table 100 listing the linestrings. The line segments are atomic, with each linestring being representable as a combination of one or more atomic line segments defined using the dimensional dictionaries, such as those explained with reference to FIG. 3A and FIG. 3B. Representation of line segments in this manner requires a column corresponding to each dimension for each of the start point or vertex and the end point or vertex that combine to form the line segments in the compressed data. Each line segment can then be identified by four index vectors, each indicating a position within the dimensional dictionaries 300, 350 at which the coordinate values of the start and end vertices of the liens segment are stored.

A polygon stored in the manner discussed above can be simplified, for example to provide a lower resolution version of the polygon for display on or transmission to a device that does not require or is otherwise not capable of displaying a polygon at the same resolution at which the polygon is stored in the database. Consistent with implementations of the current subject matter by omitting points in one or more of the line strings of a polygon. Points that that occupy a same pixel as another preceding point can be omitted. A level of simplification can be characterized by an absolute or relative change in pixel size (resolution), for example in meters or some other dimension. In other words, the polygon can have an original resolution (also referred to as a first resolution) at which details on the polygon are resolvable at a first physical distance (e.g. one meter) and a simplified resolution (also referred to as a second resolution) at which details on the polygon are resolvable at a second physical distance (e.g. ten meters, 1 km, etc.), which is greater than the first physical distance.

The simplified resolution can be characterized by a pixel size, for example in meters or some other dimension. In other words, the simplified resolution into which the polygon is projected from its original resolution can have a simplified resolution pixel size that relates to an original resolution pixel size by a simplification factor. As an example, an original resolution can include a one meter per pixel original resolution pixel size. The simplified resolution can include a simplification factor of 10 such that the simplified resolution pixel size is 10 meters per pixel.

A polygon stored can be simplified consistent with implementations of the current subject matter by omitting points in one or more of the line strings of a polygon. Points that occupy a same pixel as another preceding point in the simplified resolution can be omitted. For a polygon that is represented in a database as a sequence of paths or line segments, a reduction in resolution can cause points defining more than one line segment in the original resolution polygon to occur in the same pixel at the simplified resolution. Alternatively, for a non-linear path containing a plurality of points, two or more successive points may occupy a same pixel in the simplified resolution version of the polygon such that a second of the two successive points in the same pixel can be omitted. For a path that is compressed as line segments, the polygon can be simplified by a process that includes omitting one or more points and thereby redefining the two line segments that define the omitted point as a single line segment that spans between a starting point of the first of the two line segments and an ending point of the second of the two line segments.

In another option, interpolation to create a replacement line segment that replaces two or more line segments of a polygon can be used in place of or in addition to omission of points to convert a polygon to a simplified resolution. Referring again to FIG. 1, a part of the example polygon 100 can be simplified by omission of the first point 104 and replacement of the line segment 102 and the first neighboring line segment 106 with a new line segment 120 that spans between the second point 110 and the third point 114.

A point can be omitted if only a small error is caused by the omission. In other words, an error caused by removing any given point from the original resolution of the polygon as part of simplifying the polygon (e.g., a relative or absolute error introduced in a circumference, an area, or some other characteristic of a polygon simplified consistent with implementations of the current subject matter when compared to the original, unsimplified polygon) can be compared with a maximum allowable error value (which can be predefined, or alternatively, determined at runtime based on one or more calculated criteria). If the error for removal of a point exceeds the maximum allowable error value, the point is not omitted in the simplified resolution version of the polygon. Additional error criteria can also be considered. For example, boundaries of polygons (including reduced resolution polygons consistent with the descriptions herein) can be required to fulfill specific properties (e.g. the boundary can be required to be non-zero, and to not be self-intersecting). In general, determining of whether a point can be omitted includes determining whether an impermissible error is caused by removal of the point. An impermissible error is one that exceeds a threshold error in the circumference, area, etc. of the polygon and/or an error that results in the simplified polygon violating one or more specific properties. To avoid such an error, a local resolution of the part of the polygon (e.g. for at least one path, line segment, set of adjoining points, etc.) can be increased relative to the simplified resolution into which the simplified version of the polygon is to be rendered.

In some implementations of the current subject matter, errors can be quantified as a level of area-wise inaccuracy of a polygon. Simplified polygons in an area represented at a simplified resolution can be binned by levels of inaccuracy. An aggregation of the errors (for example a summation or other aggregating function such as an average, etc.) can be performed on the binned simplified polygons. The aggregation of errors can be reported to a user along with the simplified representation of the polygons to indicate expected levels of uncertainty to a user. The expected levels of uncertainty can be useful in speeding up queries during data exploration, for example by indicating a maximum possible level of certainty that might be obtainable from the simplified representation.

The validation process can include verifying that any boundaries of a polygon that are shared with an adjacent polygon are rendered at a same scale in both polygons. For example, errors identified in the dissecting process can be remedied by effectively increasing the resolution of part of a first polygon to eliminate the error. However, a second polygon whose boundary is shared with the part of the first polygon whose resolution was increased may not have required a similar increase in resolution. In such a scenario, the shared boundary would be rendered at one resolution in the first polygon and at a second resolution in the second polygon, identifying any parts of the simplified polygon that result in the simplified polygon being invalid. To support correcting such situations, an inverse mapping is maintained between paths in the simplified resolution and the polygons to which such paths belong. Using this inverse mapping, when a resolution of a path of a first polygon is required to be increased to avoid an error, the resolution of a corresponding path in a second polygon is similarly increased to avoid misalignment of the first and second polygons along the shared boundary. A corresponding path refers to a path that forms at least part of a shared boundary between the first and second polygons. Use of the inverse mapping as part of the validation process can include determining that a path in a first polygon is required to be rendered at a finer resolution in a simplified version of the first polygon than the simplified resolution, identifying a second polygon whose boundaries also include the path, and causing the path represented in the second polygon to also be rendered at the finer resolution in a simplified version of the second polygon.

Figure 5:
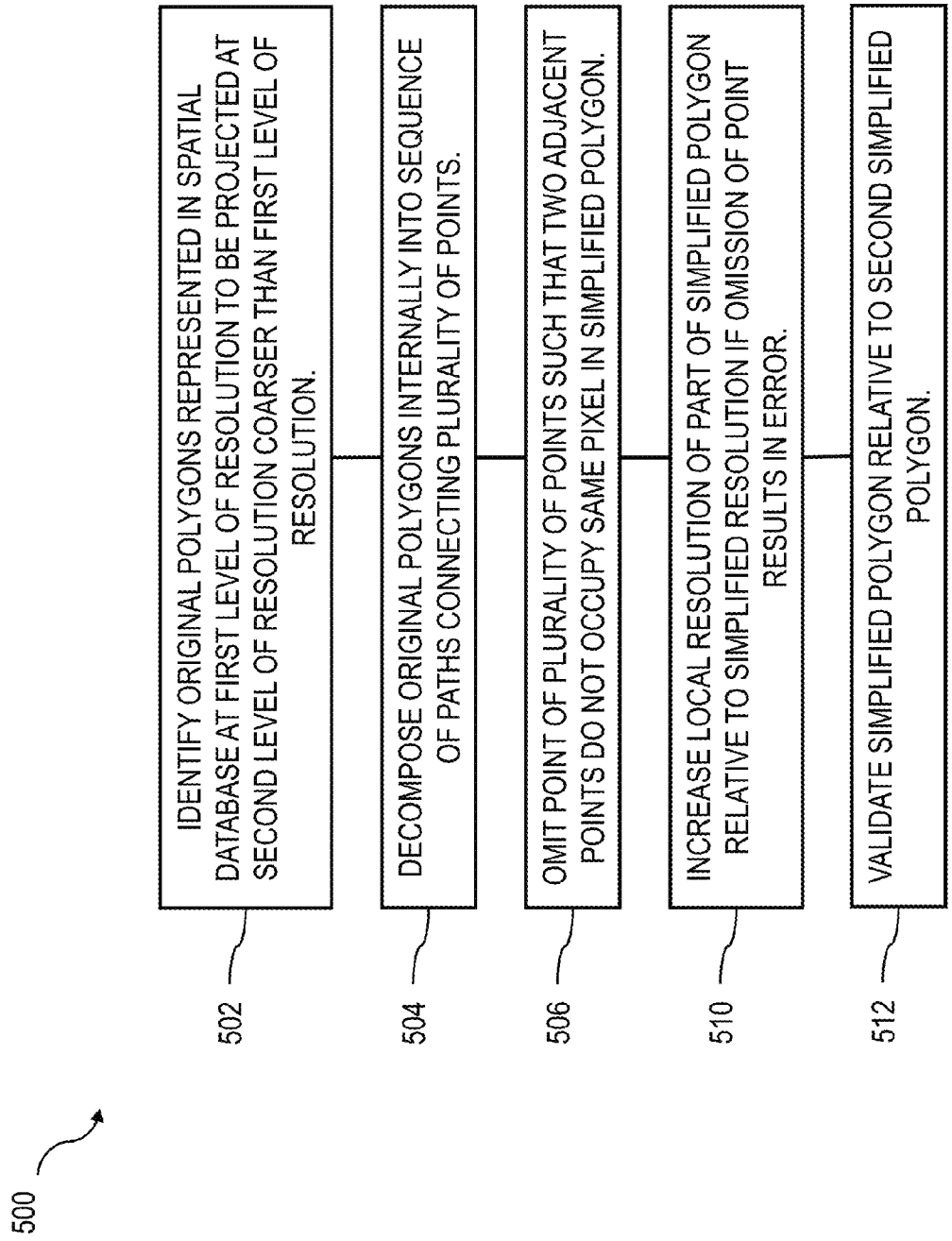
FIG. 5 shows a process flow diagram illustrating aspects of a method having one or more features consistent with implementations of the current subject matter.

FIG. 5 shows a process flow chart 500 illustrating features of a method consistent with implementations of the current subject matter. Depending on the specific implementation, one or more of the method features may be included or omitted. At 502, a plurality of original polygons represented in a spatial database at a first level of resolution is identified to be projected within a computer-rendered image at a second level of resolution that is coarser than the first level of resolution. The second level of resolution includes a simplified resolution pixel size. At 504, the plurality of original polygons are is each decomposed internally into a sequence comprising a plurality of paths connecting a plurality of points. At 506, a point of the plurality of points for a polygon of the plurality of polygons is omitted such that two adjacent points do not occupy a same pixel of the simplified resolution pixel size in the simplified polygon. At 510, a local resolution of a part of the simplified polygon is increased relative to the simplified resolution. The part includes a path within which omission of a point results in an error exceeding a threshold error and/or rendering the simplified polygon invalid.

At 512, the simplified polygon is validated, for example by verifying that any boundaries of the simplified polygon that are shared with a second simplified polygon of the plurality of polygons are rendered at a same scale in both the simplified polygon and the second simplified polygon.

The approaches discussed above can be seamlessly integrated into any column store system, such as for example an in-main memory high performance database system. As an illustrative, non-limiting example, the following description of an overall architecture, update handling, dictionary coding principles, and memory scan optimizations of such a system is provided with reference to FIG. 6 and FIG. 7.

Figure 6:
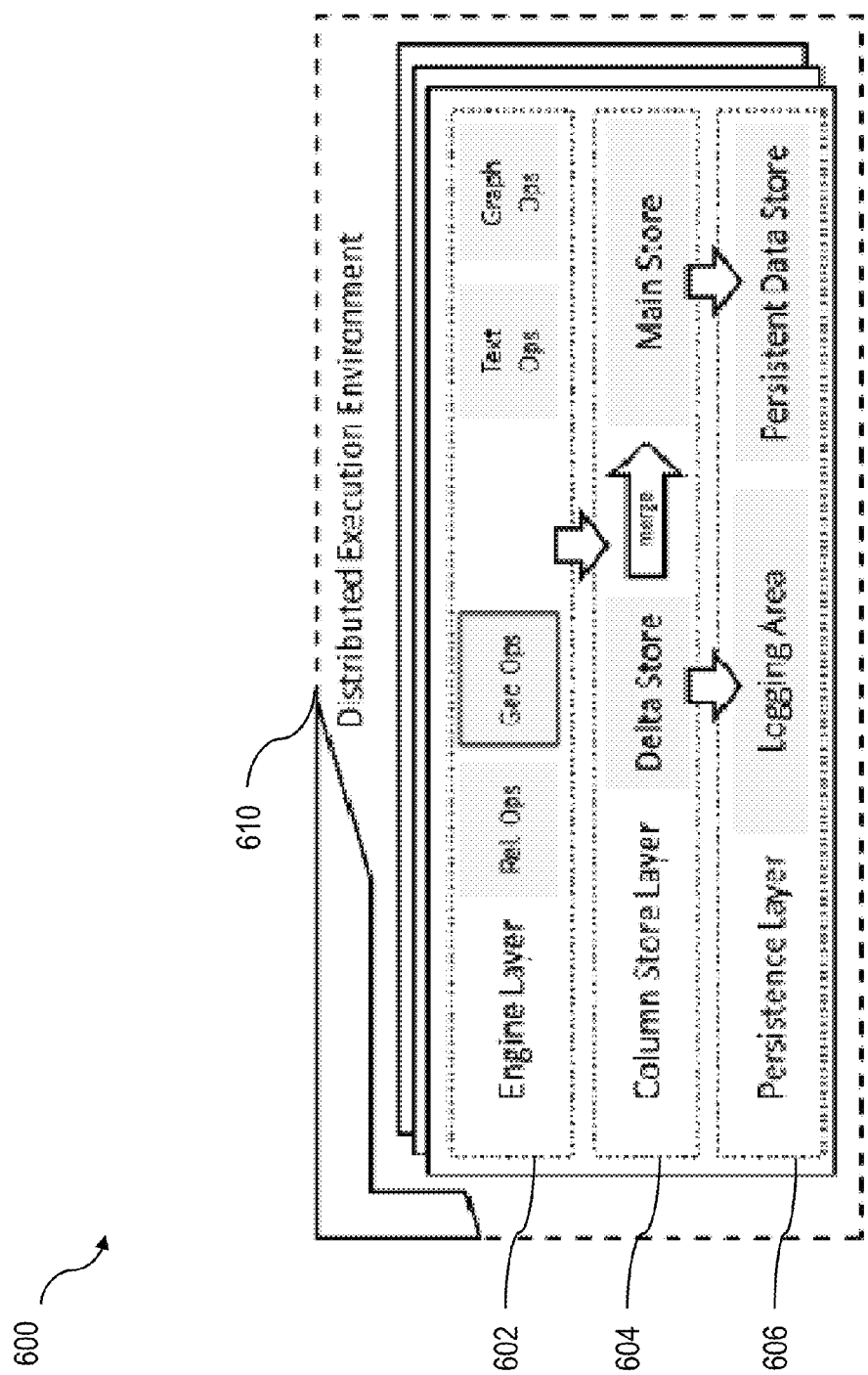
FIG. 6 shows a diagram illustrating a database environment including a column store.
Figure 7:
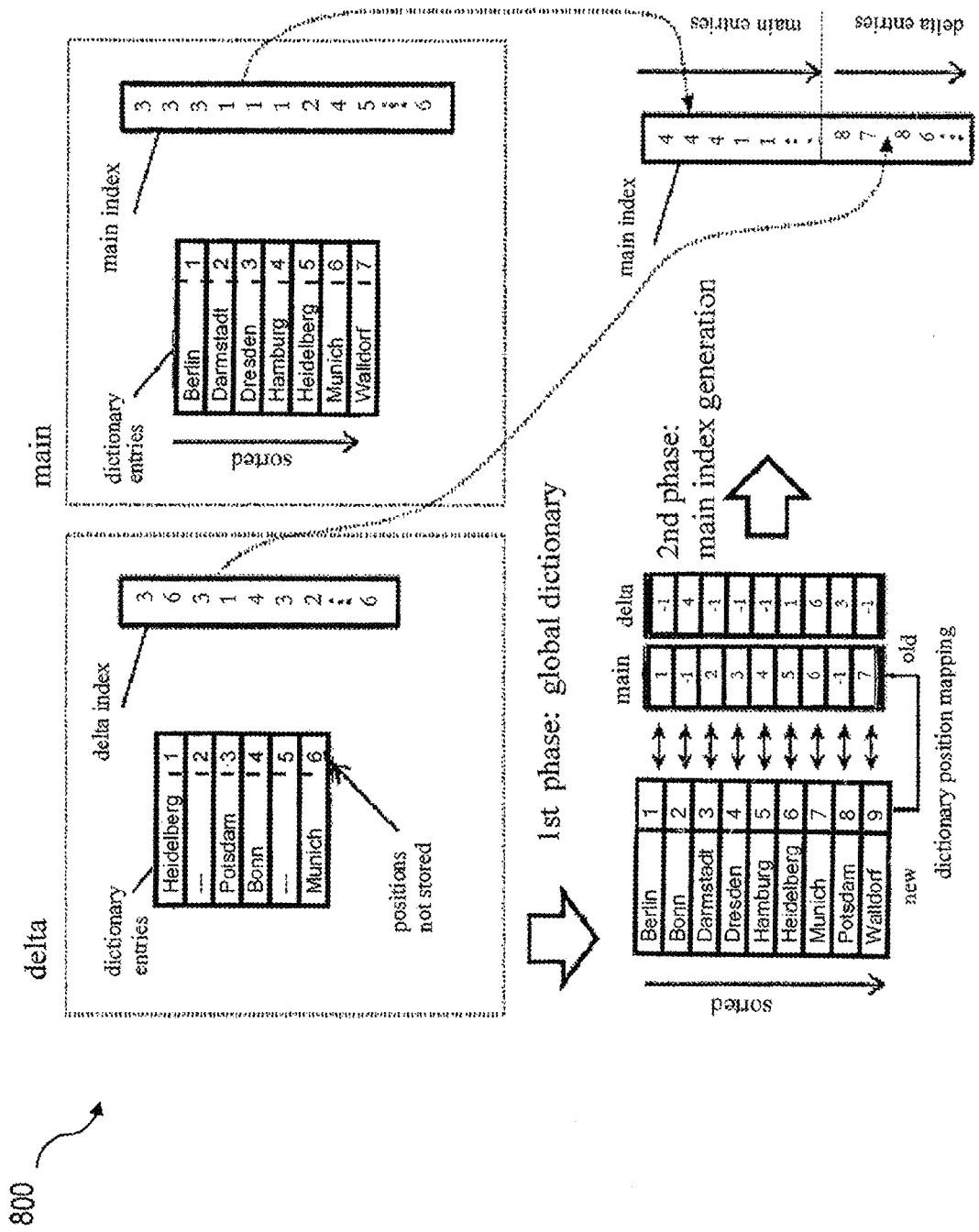
FIG. 7 a diagram illustrating data dictionaries and a corresponding bit compressed vector.

FIG. 6 shows a diagram 100 illustrating a layered architecture of an example of such a system, in which the database distinguishes between compile time and run time of a database request similarly to classical systems. As shown in FIG. 1, the layers can include an engine layer 602, a column store layer 604, and a persistence layer 606. Multiple components, such as a transaction manger, an authorization manager, a meta data (replication) manager, session management, etc., can be clustered around a distributed data flow execution environment 610. Within this environment, different sets of plan operators provide an abstraction from a column-oriented storage model to a corresponding data model. The engine can support a wide range of different set of operators ranging from relational operators (for the core SQL data model) to text or graph processing operators (e.g. for more elaborated and partially domain and vendor-specific data models). The general architectural design decouples the access primitives of the storage system from the different model-specific views on the data. The set of geo operators providing the functionality of geo-aware methods on top of geo-agnostic data structures complements this set of plan operators and automatically takes advantage of all functional and non-functional characteristics of the column store layer.

The column store layer 604 provides a transactionally consistent view to the engine layer 602 following the multi-version concurrency control (MVCC) principle. All operations of a query on top of this layer are transparently embedded into a sphere of control with access only to the correct underlying version of data.

The database also includes a write-optimized delta store and a read-optimized main store. All data modifications are reflected within the delta store, e.g., inserts of new versions of existing entities are represented within the delta. Deletes are either directly reflected in the delta or signaled via an additional bit-vector for the main store. As the delta grows over time, a merge process eventually moves delta entries to the read-optimized main structure. Modifications coming from the user or directly within the system can be encapsulated within the column store layer 604 and transparent for the engine layer 602.

A column store engine can apply dictionary encoding to all columns, independent of their cardinality of number of distinct values. As shown in diagram 700 of FIG. 7, a column then results in two data structures: a dictionary, which maps the user-values to Value IDs, and a bit compressed vector with Value IDs representing the columns of the original table. Due to frequent modifications and its temporary characteristics, the dictionary of the delta is unsorted. The dictionary of the read-optimized main, however, is sorted with respect to the user values. A merge then includes two phases. In a first phase, a new dictionary is constructed, consolidating the entries of the main and delta dictionaries and generating new Value IDs. In a second phase, the main bit compressed vectors are recreated by physically generating a new image of the bit compressed vector that includes the old entries (ignoring deletes) and new entries of the delta. Numerous highly optimized versions of the process exist to speed up the merge process for specific scenarios. Again, the layer above does not notice such internal and asynchronous reorganization steps. This database design can provide a basis for a seamless integration of data-model specific operators relying on core column store data structures. All updates, reorganizations, efficient scan implementations, etc. can be completely transparent for the engine layer 602 and can be exploited via well-defined scan methods. This arrangement allows for easy adoption of the techniques and transfer into other columnar systems.

Figure 8:
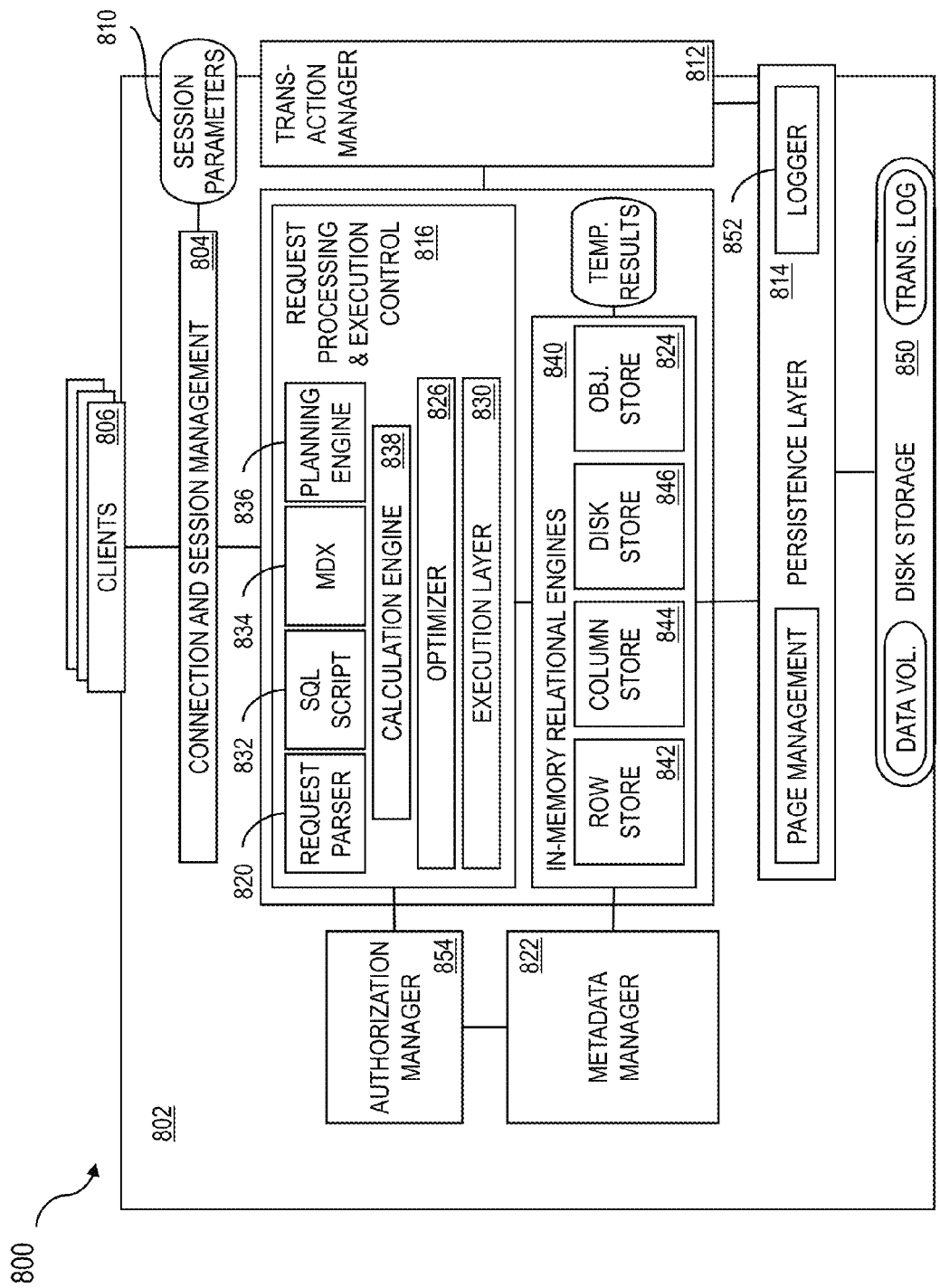
FIG. 8 shows a diagram illustrating aspects of a system showing features consistent with implementations of the current subject matter.

FIG. 8 shows a block diagram of an in-memory relational database server 800 consistent with some implementations of the current subject matter. A connection and session management component 802 of an in-memory database system 804 creates and manages sessions and connections for the database clients 806. For each session a set of parameters 810 is maintained such as for example auto commit settings or the current transaction isolation level. Once a session is established, database clients 806 can use logical (e.g. SQL) statements to communicate with the in-memory database system 804. For analytical applications the multidimensional query language MDX can also be supported.

Each statement can be processed in the context of a transaction. New sessions can be implicitly assigned to a new transaction. A transaction manager 812 can coordinate transactions, control transactional isolation, and keep track of running and closed transactions. When a transaction is committed or rolled back, the transaction manager 812 can inform the involved engines about this event so they can execute necessary actions. The transaction manager 812 can cooperate with a persistence layer to achieve atomic and durable transactions.

Requests received from the database clients 806 can be analyzed and executed by a set of request processing and execution control components 816, which can include a request parser 820 that analyses a request from a database client 806 and dispatches it to a responsible component. Transaction control statements can, for example, be forwarded to the transaction manager 812, data definition statements can be dispatched to a metadata manager 822 and object invocations can be forwarded to an in-memory object store 824. Data manipulation statements can be forwarded to an optimizer 826, which creates an optimized execution plan that is provided to an execution layer 830. The execution layer 830 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 832, which is based on side effect free functions that operate on tables using SQL queries for set processing, can be used to enable optimizations and parallelization. The MDX language 834 can be used to provide support for multidimensional queries. A planning engine 836 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 832, MDX 834, and planning engine 836 operations can be implemented using a common infrastructure called a calculation engine 838. Metadata can be accessed via the metadata manager component 822. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 822.

One or more relational engines 840, for example an in-memory row store 842, an in-memory column store 844, a disk-based store 846, and the in-memory object store 824 mentioned above can communicate with the request processing and execution control components 816, the metadata manager 822, and the in-memory persistence layer 814. The row store 842 and column store 844 are each relational in-memory data engines that can store data in a row-based or column-based way, respectively. Some data, such as for example tracing data, need not be kept in memory all the time. The disk-based store 846 can handle such data. Data in the disk-based store 146 can be primarily stored in disk storage 850 and only moved to memory buffers (e.g. the persistence layer 814) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 814 can be responsible for durability and atomicity of transactions and can ensure that the database is restored to the most recent committed state after a restart and that transactions are either completely executed or completely undone. To achieve this goal in an efficient way, the persistence layer 814 can use a combination of write-ahead logs, shadow paging and save points. The persistence layer 814 can offer interfaces for writing and reading data and can also contain a logger 852 that manages the transaction log. Log entries can be written implicitly by the persistence layer 814 when data are written via a persistence interface or explicitly by using a log interface.

An authorization manager 854 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," or "using" above and in the claims is intended to mean, "based at least in part on," or "using at least in part" such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

identifying a first of a plurality of original polygons represented in a spatial database at a first level of resolution that is to be projected within a computer-rendered image at a second level of resolution that is coarser than the first level of resolution, the second level of resolution comprising a simplified resolution pixel size;

decomposing the first original polygon internally into a sequence of a plurality of paths, each of the plurality of paths connecting two points;

generating, based at least on the decomposing of the first original polygon, a corresponding first simplified polygon, the generating comprising:

omitting, from the first original polygon, a first point, when the first point and a second point connected to the first point by one of the plurality of paths in the first original polygon occupy a same pixel of the simplified resolution pixel size;

increasing a local resolution of at least one path in the first simplified polygon comprising the second point, when the omitting of the first point results in an error;

validating the first simplified polygon, the validating comprising verifying that any boundaries of the first simplified polygon that are shared with one or more adjacent polygons are rendered at a same scale in both the first simplified polygon and the one or more adjacent polygons; and storing, in the spatial database, the first simplified polygon, the storing of the first simplified polygon comprising storing, at the spatial database, a subset of the plurality of paths comprising the first original polygon.

2. The computer program product of claim 1, wherein the verifying comprises:

determining that the at least path in the first simplified polygon corresponds to a shared boundary with the one or more adjacent polygons, the shared boundary having a lower resolution than the increased local resolution of the at least one path; and increasing the lower resolution of the shared boundary to match the increased local resolution of the at least on path.

3. The computer program product of claim 2, wherein the verifying is based at least on an inverse mapping of between the plurality of paths in the first simplified polygons and paths in the one or more adjacent polygons.

4. The computer program product of claim 1, wherein the error comprises an error in a circumference of the first simplified polygon relative to the first original polygon.

5. The computer program product of claim 1, wherein the error comprises an error in an area of the first simplified polygon relative to the first original polygon.

6. The computer program product of claim 1, wherein the error comprises at least one path in the first simplified polygon being zero and/or self-intersecting.

7. A system comprising:
  computer hardware configured to perform operations comprising:
    identifying a first of a plurality of original polygons represented in a spatial database at a first level of resolution that is to be projected within a computer-rendered image at a second level of resolution that is coarser than the first level of resolution, the second level of resolution comprising a simplified resolution pixel size;
    decomposing the first original polygon internally into a sequence of a plurality of paths, each of the plurality of paths connecting two points;
    generating, based at least on the decomposing of the first original polygon, a corresponding first simplified polygon, the generating comprising:
      omitting, from the first original polygon, a first point, when the first point and a second point connected to the first point by one of the plurality of paths in the first original polygon occupy a same pixel of the simplified resolution pixel size;
      increasing a local resolution of at least one path in the first simplified polygon comprising the second point, when the omitting of the first point results in an error; and
      validating the first simplified polygon, the validating comprising verifying that any boundaries of the first simplified polygon that are shared with one or more adjacent polygons are rendered at a same scale in both the first simplified polygon and the one or more adjacent polygons; and
    storing, in the spatial database, the first simplified polygon, the storing of the first simplified polygon comprising storing, at the spatial database, a subset of the plurality of paths comprising the first original polygon.

8. The system of claim 7, wherein the verifying comprises:
  determining that the at least path in the first simplified polygon corresponds to a shared boundary with the one or more adjacent polygons, the shared boundary having a lower resolution than the increased local resolution of the at least one path; and
  increasing the lower resolution of the shared boundary to match the increased local resolution of the at least on path.

9. The system of claim 8, wherein the verifying is based at least on an inverse mapping of between the plurality of paths in the first simplified polygons and paths in the one or more adjacent-polygons.

10. The system of claim 7, wherein the error comprises an error in a circumference of the first simplified polygon relative to the first original polygon.

11. The system of claim 7, wherein the error comprises an error in an area of the first simplified polygon relative to the first original polygon.

12. The system of claim 7, wherein the error-comprises the at least one path in the first simplified polygon being zero and/or self-intersecting.

13. The system of claim 7, wherein the computer hardware comprises:

a programmable processor; and
a machine-readable medium comprising instructions that, when executed by the programmable processor, cause the programmable processor to perform at least some of the operations.

14. A computer-implemented method, comprising:
  identifying a first of a plurality of original polygons represented in a spatial database at a first level of resolution that is to be projected within a computer-rendered image at a second level of resolution that is coarser than the first level of resolution, the second level of resolution comprising a simplified resolution pixel size;
  decomposing the first original polygon internally into a sequence of a plurality of paths, each of the plurality of paths connecting two points;
  generating, based at least on the decomposing of the first original polygon, a corresponding first simplified polygon, the generating comprising:
    omitting, from the first original polygon, a first point, when the first point and a second point connected to the first point by one of the plurality of paths in the first original polygon occupy a same pixel of the simplified resolution pixel size;
    increasing a local resolution of at least one path in the first simplified polygon comprising the second point, when the omitting of the first point results in an error; and
    validating the first simplified polygon, the validating comprising verifying that any boundaries of the first simplified polygon that are shared with one or more adjacent polygons are rendered at a same scale in both the first simplified polygon and the one or more adjacent polygons; and
  storing, in the spatial database, the first simplified polygon, the storing of the first simplified polygon comprising storing, at the spatial database, a subset of the plurality of paths comprising the first original polygon.

15. The computer-implemented method of claim 14, wherein the verifying comprises:
  determining that the at least path in the first simplified polygon corresponds to a shared boundary with the one or more adjacent polygons, the shared boundary having a lower resolution than the increased local resolution of the at least one path; and
  increasing the lower resolution of the shared boundary to match the increased local resolution of the at least on path.

16. The computer-implemented method of claim 15, wherein the verifying is based at least on an inverse mapping of between the plurality of paths in the first simplified polygons and paths in the one or more adjacent polygons.

17. The computer-implemented method of claim 14, wherein the error comprises an error in a circumference of the first simplified polygon relative to the first original polygon.

18. The computer-implemented method of claim 14, wherein the error comprises an error in an area of the first simplified polygon relative to the first original polygon.

19. The computer-implemented method of claim 14, wherein the error comprises the at least one path in the first simplified polygon being zero and/or self-intersecting.

20. The computer-implemented method of claim 14, wherein at least one of the identifying, the decomposing, the omitting, the increasing, and the validating is performed by at least one system comprising computer hardware.

* * * * *